United States Patent
Hong et al.

(10) Patent No.: US 9,843,442 B2
(45) Date of Patent: *Dec. 12, 2017

(54) OPERATION METHOD AND APPARATUS FOR PROVIDING COMPRESSION FUNCTION FOR FAST MESSAGE HASHING

(71) Applicant: ELECTRONICS AND TELECOMMUNICATIONS RESEARCH INSTITUTE, Daejeon (KR)

(72) Inventors: Deukjo Hong, Daejeon (KR); Jung Keun Lee, Daejeon (KR); Woo-Hwan Kim, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/741,511

(22) Filed: Jun. 17, 2015

(65) Prior Publication Data

US 2016/0218861 A1    Jul. 28, 2016

(30) Foreign Application Priority Data

Jan. 22, 2015    (KR) .................. 10-2015-0010693

(51) Int. Cl.
*H04L 29/06* (2006.01)
*H04L 9/06* (2006.01)

(52) U.S. Cl.
CPC ........ *H04L 9/0643* (2013.01); *H04L 2209/30* (2013.01); *H04L 2209/38* (2013.01)

(58) Field of Classification Search
CPC ... H04L 9/0643; H04L 1/1812; H04L 5/0048; H04L 5/0055; H04L 1/0071;
(Continued)

(56) References Cited

U.S. PATENT DOCUMENTS 5,842,224 A * 11/1998 Fenner ........................ 370/392
8,843,457 B2    9/2014 Shirai et al.
(Continued)

FOREIGN PATENT DOCUMENTS

JP    2010-049126 A    3/2010
KR    10-1999-0053174 A    7/1999
(Continued)

OTHER PUBLICATIONS

Deukjo Hong et al., "A New Dedicated 256-Bit Hash Function: FORK-256," FSE 2006, LNCS 4047, pp. 195-209, 2006.

*Primary Examiner* — Hadi Armouche
*Assistant Examiner* — Sakinah Taylor
(74) *Attorney, Agent, or Firm* — LRK Patent Law Firm (57) ABSTRACT

An operation apparatus includes a message expansion unit, a state data initiation unit, a state data generation unit, and a chain variable update unit. The message expansion unit generates a plurality of expanded messages using a message. The state data initiation unit generates the initial value of state data using chain variable data. The state data generation unit generates the final value of the state data by iterating a combination function and a step function using the state data and the plurality of expanded messages. The chain variable update unit updates the chain variable data using the state data of the final value.

10 Claims, 5 Drawing Sheets

(58) Field of Classification Search
CPC ......... H04L 5/0007; H04L 5/14; H04L 67/12; H04L 12/4633; H04L 1/0009; H04L 1/1621; H04L 1/1822; H04L 1/1893; H04L 27/2613; H04L 27/2628; H04L 27/2692; H04L 27/34; H04L 5/0051; H04L 5/0053; H04L 5/006; H04L 61/1511; H04L 69/321; H04L 7/0008; H04L 2209/30; H04L 2209/38
USPC .......................................................... 380/28
See application file for complete search history.

(56) References Cited

U.S. PATENT DOCUMENTS

| | | | |
|---|---|---|---|
| 2010/0135484 A1* | 6/2010 | Nishikawa | ............ H04L 9/3239 380/28 |
| 2011/0211688 A1* | 9/2011 | Shirai | .................. H04L 9/0643 380/28 |
| 2014/0355755 A1 | 12/2014 | Hong et al. | |

FOREIGN PATENT DOCUMENTS

| | | |
|---|---|---|
| KR | 10-0916805 B1 | 9/2009 |
| KR | 10-1428770 B1 | 8/2014 |

\* cited by examiner

OPERATION METHOD AND APPARATUS FOR PROVIDING COMPRESSION FUNCTION FOR FAST MESSAGE HASHING

CROSS-REFERENCE TO RELATED APPLICATION

This application claims the benefit of Korean Patent Application No. 10-2015-0010693, filed Jan. 22, 2015, which is hereby incorporated by reference herein in its entirety.

BACKGROUND

1. Technical Field

Embodiments of the present invention relate to a compression operation in a hash algorithm and, more particularly, to an operation method and apparatus for providing a compression function for fast message hashing.

2. Description of the Related Art

As a principal function of an encryption application, the encryption application provides the integrity of a message.

A hash function is a function used to ensure the integrity of a message, and is widely used in the signing and authentication of a message, etc. Generally, chain variable data is used in a hash function. A hash function divides a message into units of predetermined length and updates chain variable data using segment messages and chain variable data as input for a compression function. Final chain variable data output from the compression function may be processed by various algorithms, and the processed chain variable data becomes a hash value for the message.

In connection with a hash function, Korean Patent No 10-0916805 discloses a hash algorithm having 256-bit output, and Korean Patent No. 10-1428770 discloses an apparatus and method for performing a compression operation in a hash algorithm. In the hash algorithm disclosed in Korean Patent No. 10-1428770, the bit string of an input message having a specific length is converted into a word string, the message is converted into preset bits, and chain variable data is calculated by a compression operation performed on the converted message.

In order to improve the efficiency of the calculation speed of a hash function, a compression function, i.e., the core algorithm of a hash function, needs to be designed to be optimized and implemented for and within either a chip specialized for an encryption application or a central processing unit (CPU).

SUMMARY

At least one embodiment of the present invention is directed to the provision of an operation method and apparatus for implementing a compression function for fast message hashing.

At least one embodiment of the present invention is directed to the provision of an operation method and apparatus for implementing a compression function that are capable of enabling message hashing while ensuring protection from attacks.

In accordance with an aspect of the present invention, there is provided an operation method, including generating a plurality of expanded messages using a message; generating the initial value of state data using chain variable data; generating the final value of the state data by iterating a combination function and a step function using the state data and the plurality of expanded messages; and updating the chain variable data using the state data of the final value.

The operation method may further include generating a hash value for the message by applying a predetermined operation to the updated chain variable data.

The message may include 32w bits; w may be an integer equal to or larger than 1; and each of the plurality of expanded messages may include 16w bits.

The plurality of expanded messages may be (R+1) messages ranging from $W_0$ to $W_R$, where R is an integer equal to or larger than 1; and, for integer r equal to or larger than 0 and equal to or smaller than R, the (r+1)-th expanded message $W_r$ of the plurality of expanded messages may be used in the (r+1)-th iteration of the combination function.

The plurality of expanded messages may be (R+1) messages ranging from $W_0$ to $W_R$; the message M may be a concatenation of 32 sub messages ranging from M[0] to M[31]; and the plurality of expanded messages may be generated based on Equation 1 below:

$$W_r = W_r[0] \| W_r[1] \| \ldots \| W_r[15], 0 \le r \le R \quad (1)$$

where $W_r$ is the (r+1)-th expanded message of the plurality of expanded messages, $W_r$ is a concatenation of 16 sub expanded messages, and, for x, i.e., an integer equal to or larger than 0 and equal to or smaller than 15, $W_r[x]$ is an (x+1)-th sub expanded message of $W_r$.

The sub expanded messages may be generated based on Equations 2, 3 and 4 below:

$$W_0[i] = M[i], 0 \le i \le 15 \quad (2)$$

$$W_1[i] = M[i+16], 0 \le i \le 15 \quad (3)$$

$$W_r[i] = W_r-2[\tau(i)] \boxplus W_r-1[i], 2 \le r \le R, 0 \le i \le 15 \quad (4)$$

where the value of $\tau(i)$ is an integer equal to or larger than 0 and equal to or smaller than 15, and $\tau$ is a bijective function.

$\tau$ may meet Equations 5 and 6 below:

$$\tau(\tau(\tau(\tau(i)))) = i, 0 \le i \le 15 \quad (5)$$

$$i \ne \tau(i) \ne \tau(\tau(i)) \ne \tau(\tau(\tau(i))), 0 \le i \le 15 \quad (6)$$

$\tau$ may meet Equation 7 below:

$$\text{int}(\tau(i*4)/4) = \text{int}(\tau(i*4+1)/4) = \text{int}(\tau(i*4+2)/4 = \text{int}(\tau(i*4+3)/4), 0 \le i \le 3 \quad (7)$$

$\tau$ may be defined by Equation 8 below:

$$\begin{array}{l}\tau(0)=3, \tau(1)=2, \tau(2)=0, \tau(3)=1, \tau(4)=7, \tau(5)=4,\\ \tau(6)=5, \tau(7)=6, \tau(8)=11, \tau(9)=10, \tau(10)=8,\\ \tau(11)=9, \tau(12)=15, \tau(13)=12, \tau(14)=13,\\ \tau(15)=14\end{array} \quad (8)$$

The chain variable data CV may be a concatenation of 16 pieces of sub chain variable data ranging from CV[0] to CV[15]; the state data $X_0$ of the initial value may be sub state data of 16 initial values ranging $X_0[0]$ to $X_0[15]$; and the sub state data of the initial value may be generated based on Equation 9 below:

$$X_0[i] = CV[i], 0 \le i \le 15 \quad (9)$$

The combination function may be iterated (R+1) times; the combination function incorporates the value of $W_r$ into $X_r$ in the (r+1)-th iteration of the combination function; r may be, an integer equal to or larger than 0 and equal to or smaller than R, and $X_r$ is an (r+1)-th state data; $W_r$ may be an (r+1)-th expanded message of the plurality of expanded messages; and $X_0$ may be the state data having the initial value, and $X_R$ may be the state data having the final value.

The combination function may combine $X_r$ with $W_r$ using a logical exclusive OR operation $\oplus$ in the (r+1)-th iteration of the combination function.

The combination function may incorporate the value of $W_r$ into the state data $X_r$ based on Equation 10 below:

$$X_r[i]=X_r[i] \oplus W_r[i], 0 \leq i \leq 15 \quad (10)$$

where $X_r$ is a concatenation of 16 pieces of sub state data, $X_r[i]$ is an (i+1)-th sub state data of $X_r$, $W_r$ is a concatenation of 16 sub expanded messages, and $W_r[i]$ is an (i+1)-th sub expanded message of $W_r$.

The step function may be iterated R times; for integer r equal to or larger than 0 and equal to or smaller than (R−1), $X_{r+1}$ may be generated based on $X_r$ in the (r+1)-th iteration of the step function; $X_r$ may be state data in the (r+1)-th iteration of the step function; and $X_0$ may be the state data having the initial value, and $X_R$ may be the state data having the final value.

$X_{r+1}$ may be generated in the (r+1)-th iteration of the step function according to Equation 11 below:

$$X_{r+1}[i]=X_r[\sigma(i)], 0 \leq i \leq 15 \quad (11)$$

where a value of $\sigma(i)$ is an integer equal to or larger than 0 and equal to or smaller than 15, and $\sigma$ a bijective function.

$\sigma$ may be defined based on Equation 12 below:

$$\sigma(0)=6, \sigma(1)=4, \sigma(2)=5, \sigma(3)=7, \sigma(4)=12, \sigma(5)=15,$$
$$\sigma(6)=14, \sigma(7)=13, \sigma(8)=2, \sigma(9)=0, \sigma(10)=1,$$
$$\sigma(11)=3, \sigma(12)=8, \sigma(13)=11, \sigma(14)=10,$$
$$\sigma(15)=9 \quad (12)$$

In an (r+1)-th iteration of the step function, for i equal to or larger than 0 and equal to or smaller than 7, $X_r[i]$ may be updated based on $X_r[i+8]$; and, for i equal to or larger than 8 and equal to or smaller than 15, $X_r[i]$ may be updated based on $X_r[i-8]$.

For i equal to or larger than 0 and equal to or smaller than 15, $X_r[i]$ may be updated through the rotation of a predetermined number of bits.

In the (r+1)-th iteration of the step function, $X_{r+1}[i]$ may be generated based on based on the sequential execution of Equations 13, 14, 15, 16, 17, 18, 19 and 20 below:

$$X_r[i]=X_r[i] \boxplus X_r[i+8], 0 \leq i \leq 7 \quad (13)$$

$$X_r[i]=X_r[i]<<<a_r[i], 0 \leq i \leq 7 \quad (14)$$

$$X_r[i]=X_r[i] \oplus D_r[i], 0 \leq i \leq 7 \quad (15)$$

$$X_r[i+8]=X_r[i] \boxplus X_r[i+8], 0 \leq i \leq 7 \quad (16)$$

$$X_r[i+8]=X_r[i+8]<<<b_r[i], 0 \leq i \leq 7 \quad (17)$$

$$X_r[i]=X_r[i] \boxplus X_r[i+8], 0 \leq i \leq 7 \quad (18)$$

$$X_r[i+8]=X_r[i+8]<<<c_r[i], 0 \leq i \leq 7 \quad (19)$$

$$X_{r+1}[i]=X_r[\sigma(i)], 0 \leq i \leq 15 \quad (20)$$

where, for i equal to or larger than 0 and equal to or smaller than 15, $a_r[i]$, $b_r[i]$, $c_r[i]$ and $D_r[i]$ are constants, respectively, a value of $\sigma(i)$ is an integer equal to or larger than 0 and equal to or smaller than 15, and $\sigma$ is a bijective function.

In accordance with another aspect of the present invention, there is provided an operation apparatus, including a message expansion unit configured to generate a plurality of expanded messages using a message; a state data initiation unit configured to generate the initial value of state data using chain variable data, a state data generation unit configured to generate the final value of the state data by iterating a combination function and a step function using the state data and the plurality of expanded messages; and a chain variable update unit configured to update the chain variable data using the state data of the final value.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments will be described in detail below with reference to the accompanying drawings. It should be appreciated that these embodiments are different from each other but do not necessarily need to be exclusive of each other.

Terms used in embodiments may be interpreted based on the actual meanings of these terms and the context of the overall specification, rather than the simple names of the terms.

In embodiments, a connection between a specific part and another part may include not only a direct connection between the two parts but also an indirect connection between the two parts by way of a third part. Throughout the drawings, like reference symbols may denote like members.

In embodiments, an English letter indicative of data may be used along with square brackets "[" and "]." A number between square brackets indicates the index of an element when data indicated by an English letter has one or more elements of an array. For example, "a[0]" may indicate the first element of data 'a' having one or more elements, and "a[r]" may indicate the (r+1)-th element of data 'a.'

In embodiments, generating the value of data or a variable may refer to calculating a value to be assigned to the data or the variable or assigning a calculated value to the data or the variable.

Figure 1:
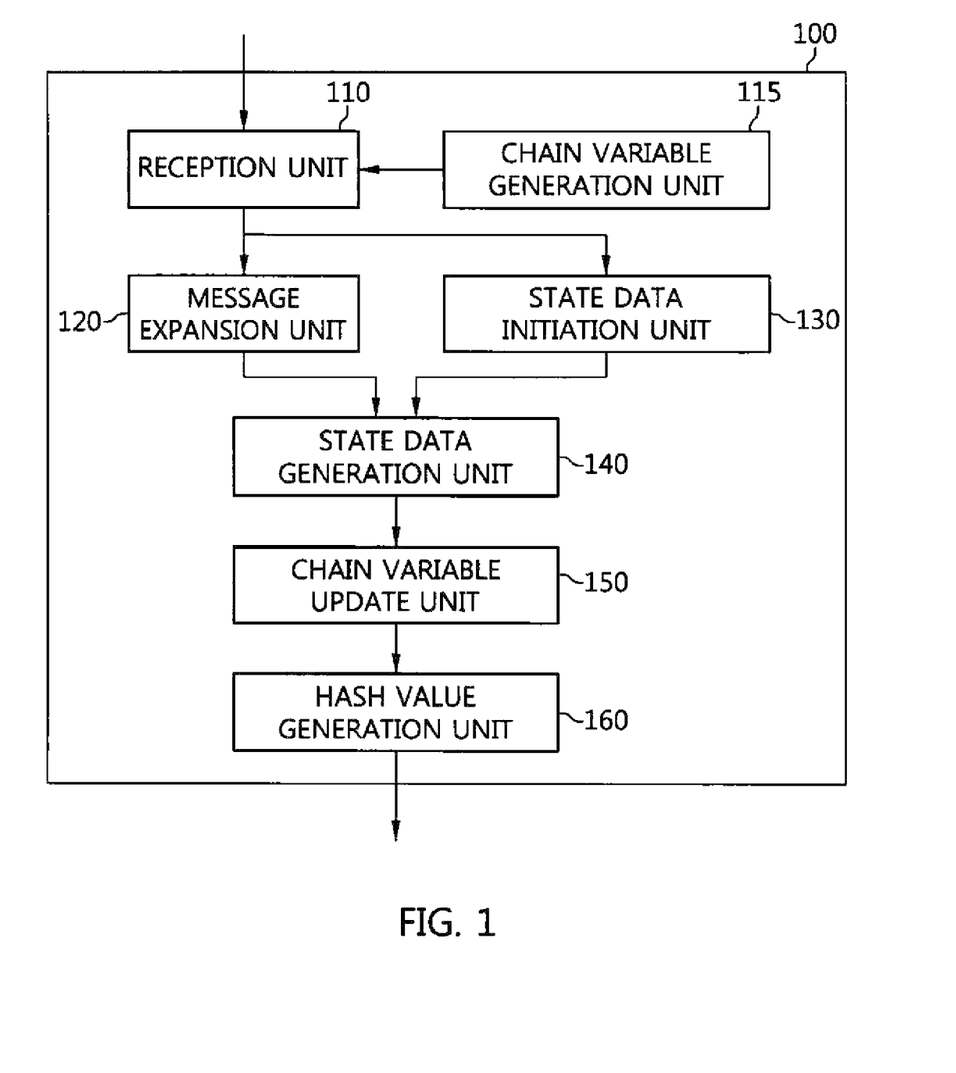
FIG. 1 is a block diagram of an operation apparatus according to an embodiment of the present invention.

FIG. 1 is a block diagram of an operation apparatus 100 according to an embodiment of the present invention.

The operation apparatus 100 may perform a compression operation that is used in a hash algorithm.

The operation apparatus 100 may include a reception unit 110, a chain variable generation unit 115, a message expansion unit 120, a state data initiation unit 130, a state data generation unit 140, a chain variable update unit 150, and a hash value generation unit 160.

According to an embodiment of the present invention, reception unit 110, at least some of the chain variable generation unit 115, the message expansion unit 120, the state data initiation unit 130, the state data generation unit 140, the chain variable update unit 150, and the hash value generation unit 160 may be program modules that communicate with an external system. These program modules may be included in the operation apparatus 100 in the form of an operating system, one or more application program modules, and/or other program modules, and may be physically stored in one or more of various well-known storage devices.

Furthermore, at least some of these program modules may be stored in a remote storage device that can communicate with the operation apparatus 100. Meanwhile, these program modules include routines, subroutines, programs, object, components and data structures that perform a specific task to be described later or execute a specific abstract data type according to the present invention, but are not limited thereto.

The reception unit 110 may receive a message and chain variable data. For example, the reception unit 110 may receive a message input by a user or input from some other external device. The reception unit 110 may receive chain variable data generated by the chain variable generation unit 115 or transmitted from some other external device.

The chain variable generation unit 115 may generate chain variable data.

The message expansion unit 120 may generate a plurality of expanded messages using a message. For example, the message expansion unit 120 may extend a message into a plurality of expanded messages.

The state data initiation unit 130 may generate the initial value of state data using the chain variable data. In this case, the initial value may refer to a value that state data has before the computation of a combination function and a step function is started. Initial state data may refer to state data having an initial value. The state data initiation unit 130 may convert chain variable data into initial state data for a compression function.

The state data generation unit 140 may generate the final value of the state data by iterating a combination function and a step function using the state data and the plurality of expanded messages. In this case, the final value may refer to a value that state data has after the computation of a combination function and a step function has been terminated. Final state data may refer to state data that has a final value.

A combination function may update state data through the combination of a plurality of expanded messages and state data, and a step function may update state data using state data. When a combination function and a step function are iterated, the combination function and the step function generate state data that will be used in a subsequent iteration. State data that will be used in a subsequent iteration may be generated by the update of state data.

The chain variable update unit 150 may update the chain variable data using the state data of the final value.

The hash value generation unit 160 may generate a hash value for the message by applying a predetermined operation to the updated chain variable data. In this case, the predetermined operation may be an existing function, an existing algorithm or an existing method that generates a hash value for a message based on chain variable data.

In an embodiment, the above-described state data may refer to the temporary value of the chain variable data that is used in the combination function and the step function. The initial value of the state data may be the value of the chain variable data before the iteration of the combination function and the step function is performed, and the final value of the state data may be the value of the chain variable data after the iteration of the combination function and the step function has been performed. In the combination function and the step function, an operation on the state data may be also construed as being performed on the chine variable data. For example, the state data generation unit 140 may generate the final value of the chain variable data by iterating the combination function and the step function using the chain variable data and the plurality of expanded messages.

Furthermore, the combination function may update the chain variable data through the combination of the plurality of expanded messages and the chain variable data, and the step function may update the chain variable data using the chain variable data.

Figure 2:
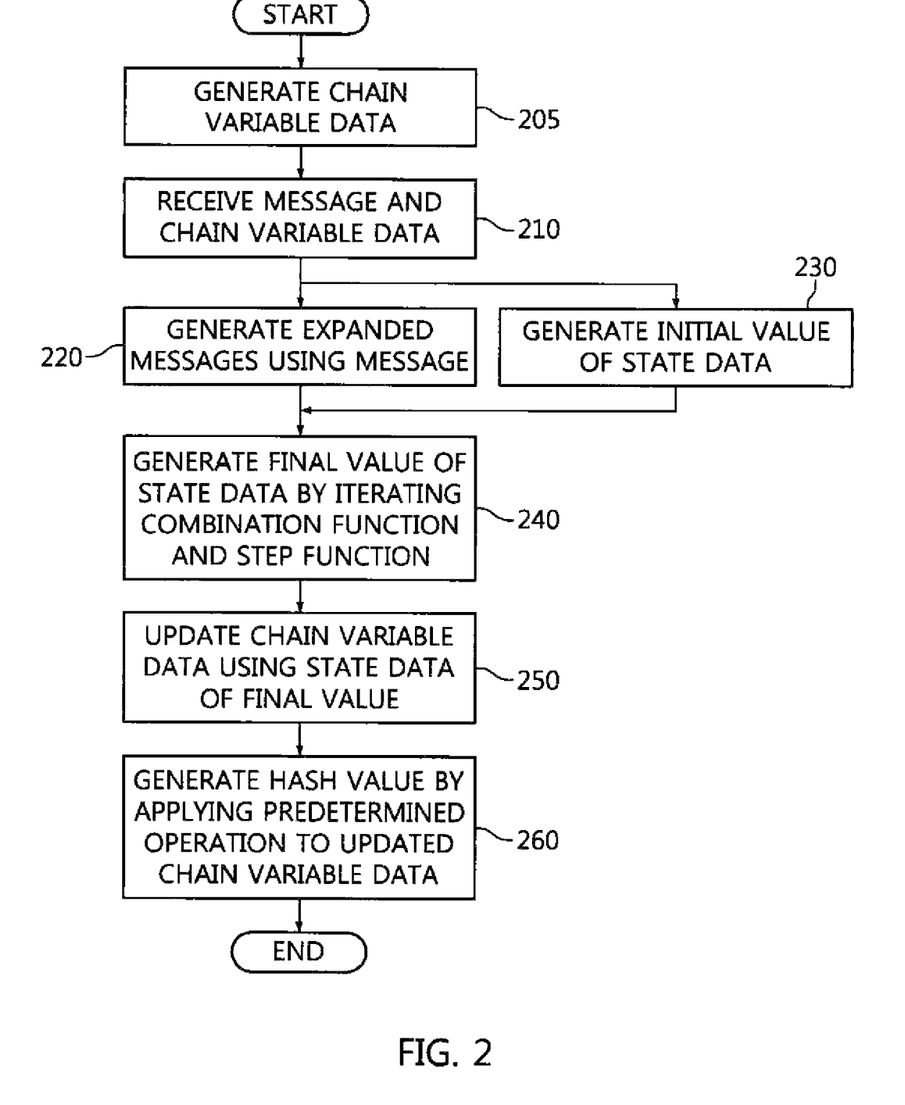
FIG. 2 is a flowchart of an operation method for an operation apparatus according to an embodiment of the present invention.

FIG. 2 is a flowchart of an operation method for an operation apparatus according to an embodiment of the present invention.

At step 205, the chain variable generation unit 115 may generate chain variable data CV. Since step 205 is optional, the chain variable data may be transmitted from some other external device.

At step 210, the reception unit 110 may receive a message M and the chain variable data CV. For example, the reception unit 110 may receive the message M input by a user or input from some other external device. Furthermore, the reception unit 110 may receive the chain variable data CV generated by the chain variable generation unit 115 transmitted from some other external device.

The message M may be a target for compression and encryption. The message M may include 32w bits. In other words, the number of bits of the message M may be 32w. w may be an integer equal to or larger than 1.

The chain variable data CV may include 16w bits. In other words, the number of bits of the chain variable data CV may be 16w. The chain variable data CV may have half of the length of the message M.

The message M may be a concatenation of 32 sub messages ranging from M[0] to M[31]. Each of the 32 sub messages may include w bits. In other words, the number of bits of each sub message may be w.

The relationship between the message M and the plurality of sub messages may be expressed by Equation 1 below:

$$M=M[0]\|M[1]\| \ldots \|M[31] \tag{1}$$

where "∥" may denote a concatenation operation.

At step 220, the message expansion unit 120 may generate a plurality of expanded messages using the message M. For example, the message expansion unit 120 may extend a message into a plurality of expanded messages.

The plurality of expanded messages may be (R+1) messages ranging from $W_0$ to $W_R$. R may be an integer equal to or larger than 1.

The plurality of expanded messages may be represented by Equation 2 below:

$$W_0, W_1, \ldots, W_R : W_r, 0 \le r \le R \tag{2}$$

where $W_r$ may be the (r+1)-th one of the plurality of expanded messages.

The plurality of expanded messages may be sequentially used while a combination function to be described is being iterated. For r equal to or larger than 0 or equal to or lower than R, the (r+1)-th expanded message r may be used in the (r+1)-th iteration of the combination function.

Each of the plurality of expanded messages may include 16w bits. Each expanded message may have half of the length of the message M.

The message expansion unit 120 may generate the plurality of expanded messages based on Equation 3 below:

$$W_r = W_r[0]\|W_r[1]\| \ldots \|W_r[15], 0 \le r \le T \tag{3}$$

For integer x equal to or larger than 0 and equal to or lower than 15, $W_r[x]$ may be the (x+1)-th sub expanded message of the expanded messages $W_r$. As described in Equation 3, the expanded messages $W_r$ may, be a concatenation of $W_r[0]$ to $W_r[15]$, i.e., 16 sub expanded messages.

The relationship between the expanded messages and the sub expanded messages may be expressed by Equation 4 below:

$$W_0, W_1, \ldots, W_R; W_r = W_r[0] \| W_r[1] \| \ldots \| W_r[15], \quad 0 \le r \le R \quad (4)$$

The message expansion unit 120 may generate the sub expanded messages based on Equations 5, 6 and 7 below. In other words, a total of (R+1) 16w-bit expanded messages may be generated from the 32w-bit message M based on Equations 5, 6 and 7 below:

$$W_0[i] = M[i], \quad 0 \le i \le 15 \quad (5)$$

$$W_1[i] = M[i+16], \quad 0 \le i \le 15 \quad (6)$$

$$W_r[i] = W_{r-2}[\tau(i)] \boxplus W_{r-1}[i], \quad 2 \le r \le R, \ 0 \le i \le 15 \quad (7)$$

In these equations, for x including w bits and y including w bits, "$x \boxplus y$" may be an operation that output the remainder when the sum of a value representing x using a positive integer and a value representing y using a positive integer is divided by 2w. The remainder may be w bits. In other words, $\boxplus$ may be the remainder of w bits when the sum of the left operand, i.e., a positive integer, and the right operand, i.e., a positive integer, is divided by 2w.

The value of $\tau(i)$ may be an integer equal to or larger than 0 and equal to or lower than 15, and T may be a bijective function. T may be defined by Equation 8 below:

$$\tau(0)=3, \tau(1)=2, \tau(2)=0, \tau(3)=1, \tau(4)=7, \tau(5)=4,$$
$$\tau(6t)=5, \tau(7)=6, \tau(8)=11, \tau(9)=10, \tau(10)=8,$$
$$\tau(11)=9, \tau(12)=15, \tau(13)=12, \tau(14)=13,$$
$$\tau(15)=14 \quad (8)$$

Furthermore, $\tau$ according to an embodiment of the present invention may be defined in various ways within a range in which predetermined conditions are met. For example, $\tau$ may meet the conditions of Equations 9 and 10 below:

$$\tau(\tau(\tau(\tau(i))))=i, \quad 0 \le i \le 15 \quad (9)$$

$$i \ne \tau(i) \ne \tau(\tau(i)) \ne \tau(\tau(\tau(i))), \quad 0 \le i \le 15 \quad (10)$$

For example, in the case where i equal to or larger than 0 and equal to or smaller than 15 is input to $\tau$ and an output from $\tau(i)$ is input to a subsequent $\tau$ again, when i passes through 4 $\tau$S, the original i may be output again, and values output in an intermediate process and i, i.e., a final output, may be different from one another.

Alternatively, $\tau$ may meet the condition of Equation 11 or 12 below:

$$\text{int}(i/4) = \text{int}(\tau(i)/4), \quad 0 \le i \le 15 \quad (11)$$

$$\text{int}(\tau(i*4)/4) = \text{int}(\tau(i*4+1)/4) = \text{int}(\tau(i*4+2)/4 = \text{int}(\tau(i*4+3)/4), \quad 0 \le i \le 3 \quad (12)$$

In these equations, int(x) may be the maximum integer that is equal to or smaller than x. For example, for i equal to or larger than 0 and equal to or smaller than 3, $\tau(i)$ may be, equal to or larger than 0 and equal to or smaller than 3. For i equal to or larger than 4 and equal to or smaller than 7, $\tau(i)$ may be equal to or larger than 4 and equal to or smaller than 7. For i equal to or larger than 8 and equal to or smaller than 11, $\tau(i)$ may be equal to or larger than 8 and equal to or smaller than 11. Furthermore, for i equal to or larger than 12 and equal to or smaller than 15, $\tau(i)$ may be equal to or larger than 12 and equal to or smaller than 15.

The message expansion unit 120 may output the (R+1) 16w-bits expanded messages $W_0, W_1, \ldots, W_R$, generated based on the 32w-bit message M, to the state data generation unit 140.

At step 230, the state data initiation unit 130 may generate the initial value of state data using the chain variable data CV. Initial state data $X_0$ may refer to state data having an initial value.

The state data initiation unit 130 may convert the 16w-bit chain variable data CV into the 16w-bit initial state data $X_0$.

The chain variable data CV may be a concatenation of 16 pieces of sub chain variable data ranging from CV[0] to CV[15]. The relationship between the chain variable data CV and the sub chain variable data may be expressed by Equation 13 below:

$$CV = CV[0] \| CV[1] \| \ldots \| CV[15] \quad (13)$$

The initial state data $X_0$ may be a concatenation of 16 pieces of sub state data of initial values ranging from $X_0[0]$ to $X_0[15]$. Initial sub state data may refer to sub state data having an initial value.

The relationship between the initial state data $X_0$ and the initial sub state data may be expressed by Equation 14 below:

$$X_0 = X_0[0] \| X_0[1] \| \ldots \| X_0[15] \quad (14)$$

The initial sub state data may be generated based on Equation 15 below:

$$X_0[i] = CV[i], \quad 0 \le i \le 15 \quad (15)$$

In other words, for i equal to or larger than 0 and equal to or smaller than 15, the value of CV[i] may be copied to $X_0[i]$. Alternatively, the value of $X_0[i]$ may be set to a value identical to that of CV[i].

The state data initiation unit 130 may output the initial state data, generated by the conversion of chain variable data, to the state data generation unit 140.

At step 240, the state data generation unit 140 may generate the final value of the state data by iterating a combination function and a step function using the state data and the plurality of expanded messages. The final state data $X_R$ may refer to state data having a final value.

The state data generation unit 140 may receive (R+1) 16w-bit expanded messages from the message expansion unit 120, and may receive the initial state data $X_0$ from the state data initiation unit 130.

The state data generation unit 140 may sequentially iterate a combination function and a step function.

The combination function may be iterated (R+1) times, and the step function may be iterated R times. When r is an integer equal to or larger than 0 and equal to or smaller than (R−1), the step function of an (r+1)-th iteration may be executed after the combination function of the (r+1)-th iteration has been executed. After the step function of the (r+1)-th iteration has been executed, the combination function of a (r+2)-th iteration is executed. In other words, the step function of the (r+1)-th iteration may be performed between the combination function of an r-th iteration and the combination function of the (r+1)-th iteration. Furthermore, after the step function of an R-th iteration has been performed last, the combination function of an (R+1)-th iteration may be executed.

When the combination function and the step function are iterated, the value of the state data may be updated, and state data used in each iteration may be generated. $X_0$ may be state data having an initial value, and may represent the value of state data before the execution of the combination function and the step function. $X_R$ may be state data having a final value, and may represent the value of state data after the execution of the combination function and the step function.

The state data may be classified into pieces of state data other than $X_0$ and $X_R$ in response to the iterations of the combination function and the step function. The state data may be classified into (R+1) pieces of state data ranging from $X_0$ to $X_R$. For r equal to or larger than 0 and equal to or smaller than R, an (r+1)-th state data $X_r$ may be a concatenation of 16 pieces of sub state data ranging from $X_r[0]$ to $X_r[15]$.

The relationship between $X_r$ and the sub state data of $X_r$ may be expressed by Equation 16 below:

$$X_r = X_r[0] \| X_r[1] \| \ldots \| X_r[15] \quad (16)$$

For i equal to or larger than 0 and equal to or smaller than 15, $X_r[i]$ may be the (i+1)-th sub state data of $X_r$.

First, a combination function according to an embodiment of the present invention is described below.

When r is an integer equal to or larger than 0 and equal to or smaller than R, the combination function may incorporate the value of $W_r$ into $X_r$ in the (r+1)-th iteration of the combination function. $X_r$ may be an (r+1)-th state data, and $W_r$ may be the (r+1)-th one of the plurality of expanded messages. In other words, the (r+1)-th state data $X_r$ and the (r+1)-th expanded message $W_r$ may refer to state data and an expanded message, respectively, used in the (r+1)-th iteration of the combination function. For example, in the (r+1)-th iteration of the combination function, $X_r$ may be updated by $X_r$ and $W_r$.

Furthermore, when r is an integer equal to or larger than 0 and equal to or smaller than R and i is an integer equal to or larger than 0 and equal to or smaller than 15, $X_r[j]$ may be updated by $X_r[i]$ and $W_r[i]$ in the (r+1)-th iteration of the combination function. $X_r[i]$ may be the (i+1)-th sub state data of $X_r$. $W_r[i]$ may be the (i+1)-th sub expanded message of $W_r$.

The combination function may executed the operation of Equation 17 below:

$$X_r[i] = X_r[i] \oplus W_r[i], \ 0 \le i \le 15 \quad (17)$$

The combination function may incorporate the value of $W_r$ into $X_r$ based on Equation 17. The combination function may combine $X_r$ with $W_r$ using a logical exclusive OR operation $\oplus$ in the (r+1)-th iteration of the combination function, as shown in Equation 17. A $\oplus$ operation may be an operation that outputs the result of XOR of two operands. In other words, the combination may refer to XOR of $W_r$ with $X_r$, and $X_r$ may be updated through XOR with $W_r$.

Furthermore, the combination function may incorporate the value of $W_r[i]$ into $X_r[i]$ based on Equation 12. In the (r+1)-th iteration of the combination function, $X_r[i]$ may be combined with $W_r[i]$ using a logical exclusive OR operation. In other words, the combination may refer to XOR of $W_r[i]$ with $X_r[i]$, and $X_r[i]$ may be updated through XOR with $W_r[1]$.

Next, a step function according to an embodiment of the present invention is described below.

As described above, for r equal to or larger than 0 and equal to or smaller than (R-1), $X_r$ may be state data in the (r+1)-th iteration of the step function. In the (r+1)-th iteration of the step function, the value of $X_r$ may be updated, and $X_{r+1}$ may be generated based on $X_r$. In other words, the step function may be considered to be a process of generating state data $X_{r+1}$ at a subsequent step using state data $X_r$ at a current step. The generated state data $X_{r+1}$ at the subsequent step may be combined with $W_{r+1}$ in the iteration of the subsequent combination function. The previous descriptions of the update and generation of the state data may be applied to sub state data.

For r equal to or larger than 0 and equal to or smaller than (R-1), in the (r+1)-th iteration of the step function, $X_{r+1}[i]$ may be generated based on the sequential execution of Equations 18, 19, 20, 21, 22, 23, 24, 25 and 26 below:

$$X_r[i] = X_r[i] \boxplus X_r[i+8], \ 0 \le i \le 7 \quad (18)$$

$$X_r[i] = X_r[i] <<< a_r[i], \ 0 \le i \le 7 \quad (19)$$

$$X_r[i] = X_r[i] \oplus D_r[i], \ 0 \le i \le 7 \quad (20)$$

$$X_r[i+8] = X_r[i] \boxplus X_r[i+8], \ 0 \le i \le 7 \quad (21)$$

$$X_r[i+8] = X_r[i+8] <<< b_r[i], \ 0 \le i \le 7 \quad (22)$$

$$X_r[i] = X_r[i] \boxplus X_r[i+8], \ 0 \le i \le 7 \quad (23)$$

$$X_r[i+8] = X_r[i+8] <<< c_r[i], \ 0 \le i \le 7 \quad (24)$$

$$X_{r+1}[i] = X_r[\sigma(i)], \ 0 \le i \le 15 \quad (25)$$

In this case, "x<<<y" may be an operation that outputs a result in which x has been rotated to the left by the bits of the value of y. In other words, an <<< operation may generate a value in which a left operand has been rotated to the left by the bits of the value of the right operand.

For i equal to or larger than 0 and equal to or smaller than 15, $a_r[i]$, $b_r[i]$, $c_r[i]$ and $D_r[i]$ may be constants, respectively. Different final state data $X_R$ may be generated for the same message M and the same chain variable data CV by adjusting the values of $a_r[i]$, $b_r[i]$, $c_r[i]$ and $D_r[i]$. In other words, the result according to the method of an embodiment may be prevented from being unified through the adjustment of the values of $a_r[i]$, $b_r[i]$, $c_r[i]$ and $D_r[i]$.

$D_r$ may be a constant having 8w bits. $D_r$ may be a concatenation of $D_r[0]$ to $D_r[7]$. D may be expressed by Equation 26 below:

$$D_r = D_r[0] \| D_r[1] \| \ldots \| D_r[7] \quad (26)$$

For i equal to or larger than 0 and equal to or smaller than 15, $D_r[i]$ may be a constant.

In other words, Equations 18 to 25 may represent the processes of the update $X_r$ and the generation of $X_{r+1}$ using the step function. For example, in the (r+1)-th iteration of the step function, $X_{r+1}$ may be generated according to Equation 21. The value of $\sigma(i)$ may be an integer equal to or larger than 0 and equal to or smaller than 15, and $\sigma$ may be a bijective function.

As shown in Equations 18 to 24, in the (r+1)-th iteration of the step function, for i equal to or larger than 0 and equal to or smaller than 7, $X_r[i]$ may be updated based on $X_r[i+8]$, and, for i equal to or larger than 8 and equal to or smaller than 15, $X_r[i]$ may be updated based on $X_r[i-8]$. For I equal to or larger than 0 and equal to or smaller than 7, $X_r[i]$ and $X_r[i+8]$ may influence each other, and may not be influenced by all sub state data except $X_r[i]$ and $X_r[i+8]$.

For i equal to or larger than 0 and equal to or smaller than 15, $X_r[i]$ may be updated by the rotation of a predetermined number of bits. In an embodiment, for i equal to or larger than 0 and equal to or smaller than 7, $X_r[i]$ may be generated by a $\boxplus$ operation with $X_r[i+8]$, the rotation of a predetermined number of bits and a $\oplus$ operation with a constant. For i equal to or larger than 8 and equal to or smaller than 15, $X_r[i]$ may be generated by a operation with $X_r[i-8]$ and the rotation of a predetermined number of bits.

$\sigma$ may be defined by Equation 27 below:

$$\sigma(0)=6, \ \sigma(1)=4, \ \sigma(2)=5, \ \sigma(3)=7, \ \sigma(4)=12, \ \sigma(5)=15,$$
$$\sigma(6)=14, \ \sigma(7)=13, \ \sigma(8)=2, \ \sigma(9)=0, \ \sigma(10)=1,$$
$$\sigma(11)=3, \ \sigma(12)=8, \ \sigma(13)=11, \ \sigma(14)=10,$$
$$\sigma(15)=9 \quad (27)$$

Furthermore, σ according to an embodiment of the present invention may be defined in various manner within a range that a predetermined condition is met. For example, σ may meet the condition of Equation 28:

$$\text{Int}(\sigma(i*4)/4)=\text{int}(\sigma(i*4+1)/4)=\text{int}(\sigma(i*4+2)/4=\text{int}(\sigma(i*4+3)/4), \ 0\leq i\leq 3 \quad (28)$$

As described above, when the step function and the compression function have been iterated (R−1) times, the step function of an (R+1)-th iteration can be executed.

$X_R[i]$ may be generated by the execution of the step function of the (R+1)-th iteration. $X_R[i]$ may be generated based on the execution of Equation 29 below:

$$X_R[i]=X_R[i]\oplus W_R[i], \ 0\leq i\leq 15 \quad (29)$$

The state data generation unit 140 may generate the final state data $X_R$ by concatenating the sub state data $X_R[0]$ to $X_R[15]$ generated by the compression function. The state data generation unit 140 may transmit the final state data $X_R$ to the chain variable update unit 150.

An operation that computes the final state data $X_R$ via a combination function and a step function using initial state data R0 and expanded messages according to an example is described in detail below with reference to FIG. 3.

At step 250, the chain variable update unit 150 may update chain variable data using the state data of a final value.

The chain variable update unit 150 may update chain variable data CV, transmitted by the reception unit 110, using the final state data $X_R$ transmitted by the state data generation unit 140, and may transmit the updated chain variable data CV' to the hash value generation unit 160.

The updated chain variable data CV' may include 16w bits. In other words, the number of bits of the updated chain variable data CV' may be 16w.

The updated chain variable data CV' may be a concatenation of 16 pieces of updated sub chain variable data ranging from CV'[0] to CV'[15]. The relationship between the updated chain variable data CV' and the updated sub chain variable data may be expressed by Equation 30 below:

$$CV'=CV'[0]\|CV'[1]\|\ldots\|CV'[15] \quad (30)$$

The updated sub chain variable data may be generated based on Equation 31 below:

$$CV'[i]=X_R[i], \ 0\leq i\leq 15 \quad (31)$$

In other words, for i equal to or larger than 0 and equal to or smaller than 15, the value of $X_R[i]$ may be copied to CV'[i]. Alternatively, the value of CV'[i] may be set to a value identical to that of $X_R[i]$.

At step 260, the hash value generation unit 160 may generate the hash value of a message by applying a predetermined operation to the updated chain variable data.

The hash value generation unit 160 may generate the hash value of the message M using an existing hashing-related function, algorithm and method.

Figure 3:
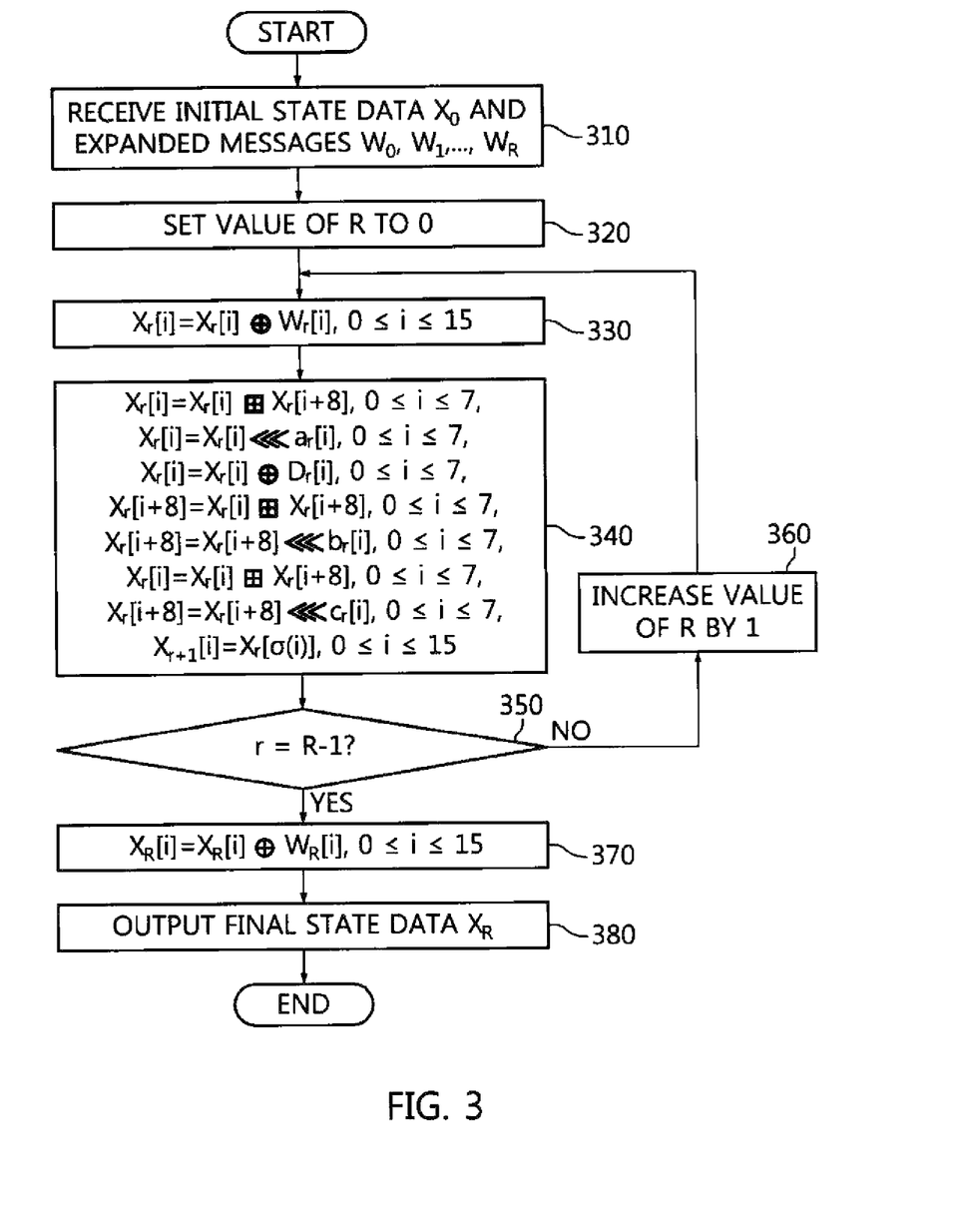
FIG. 3 illustrates a method of generating state data according to an example.

FIG. 3 illustrates a method of generating state data according to an example.

Step 240 described with reference to FIG. 2 may include steps 310, 320, 330, 340, 350, 360, 370 and 380, which are described below.

At step 310, the state data generation unit 140 may receive the initial state data $X_0$ from the state data initiation unit 130, and may receive the expanded messages $W_0$ to $W_R$ from the message expansion unit 120.

At step 320, the state data generation unit 140 may set the value of r to 0.

At step 330, the state data generation unit 140 may perform the (r+1)-th iteration of the combination function. The operation performed in the combination function is illustrated in FIG. 3.

At step 340, the state data generation unit 140 may perform the (r+1)-th iteration of the step function. The operation performed in the step function is illustrated in FIG. 3.

At step 350, the state data generation unit 140 may check whether the value of r is (R−1). If the value of r is not (R−1), step 360 may be performed for the iteration of the combination function and the step function. If the value of r is (R−1), step 370 may be performed for the last iteration of the combination function. Alternatively, the state data generation unit 140 may check whether the value of r is smaller than (R−1). If the value of r is smaller than (R−1), step 460 may be performed for the iteration of the combination function and the step function. If the value of r is equal to or larger than (R−1), step 370 may be performed for the last iteration of the combination function.

At step 360, the state data generation unit 140 may increase the value of r by 1.

At step 370, the state data generation unit 140 may perform the R-th iteration of the combination function. An operation that is performed in the R-th iteration of the combination function is illustrated in FIG. 3. The final state data $X_R$ may be generated by the R-th iteration of the combination function.

At step 380, the state data generation unit 140 may output the final state data $X_R$.

Figure 4:
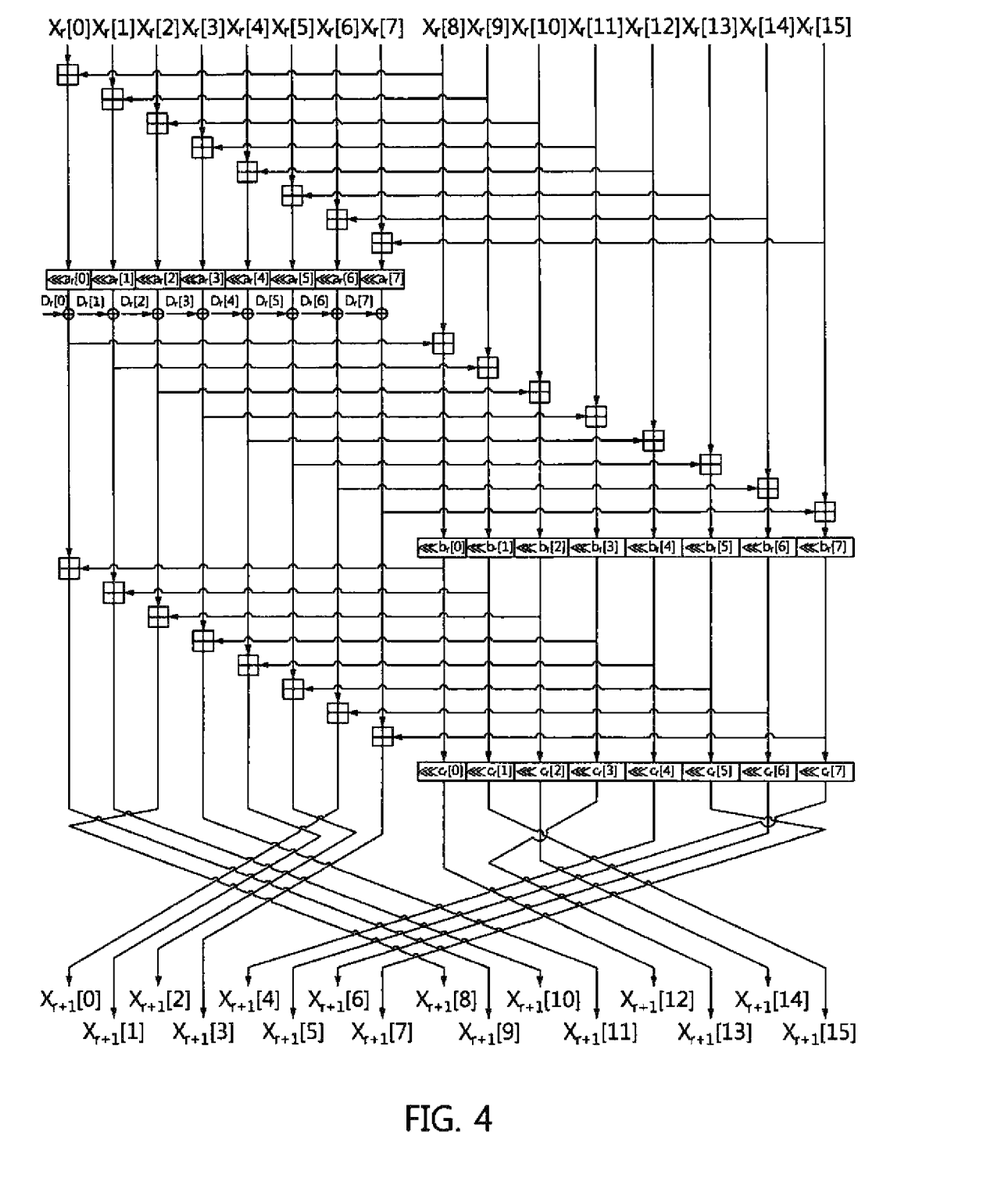
FIG. 4 is a diagram of a step function according to an example.

FIG. 4 is a diagram of a step function according to an example.

In FIG. 4, for r equal to or larger than 0 and equal to or smaller than (R−1), an operation that is performed in the (r+1)-th iteration of step function is illustrated in the diagram.

As illustrated in FIG. 4, in the (r+1)-th iteration of the step function, $X_r[0]$ to $X_r[15]$ may be used as input, and $X_{r+1}[0]$ to $X_{r+1}[15]$ may be generated as output.

In FIG. 4, operations that are applied to $X_r[0]$ to $X_r[15]$ are sequentially illustrated from top to bottom.

In FIG. 4, each vertical line may represent the value of $X_r[i]$ that is indicated above the vertical line. Each lateral line may mean that $X_r[x]$ indicated above the tail of the lateral line is used as an operand that updates the value of $X_r[y]$ indicated above the head of the lateral line.

Each arrow extending to ⊞ may represent the operand of ⊞. Each arrow extending from ⊞ may represent the result of a ⊞ operation.

Each arrow extending to ⊕ may represent the operand of ⊕. Each arrow extending from ⊕ may represent the result of a ⊕ operation.

Each arrow extending to a rectangle may represent the left operand of an operation represented by the rectangle, and operators inside the rectangle may represent the operation of the rectangle. A symbol right to each operator may represent the right operand of the operation represented by the rectangle. In FIG. 4, an <<< operation is illustrated as an operator represented by a rectangle.

In FIG. 4, $X_{r+1}[i]$ shown at the bottom of the diagram may indicate that the value of $X_{r+1}[i]$ is generated using X[i] corresponding to a corresponding arrow.

Figure 5:
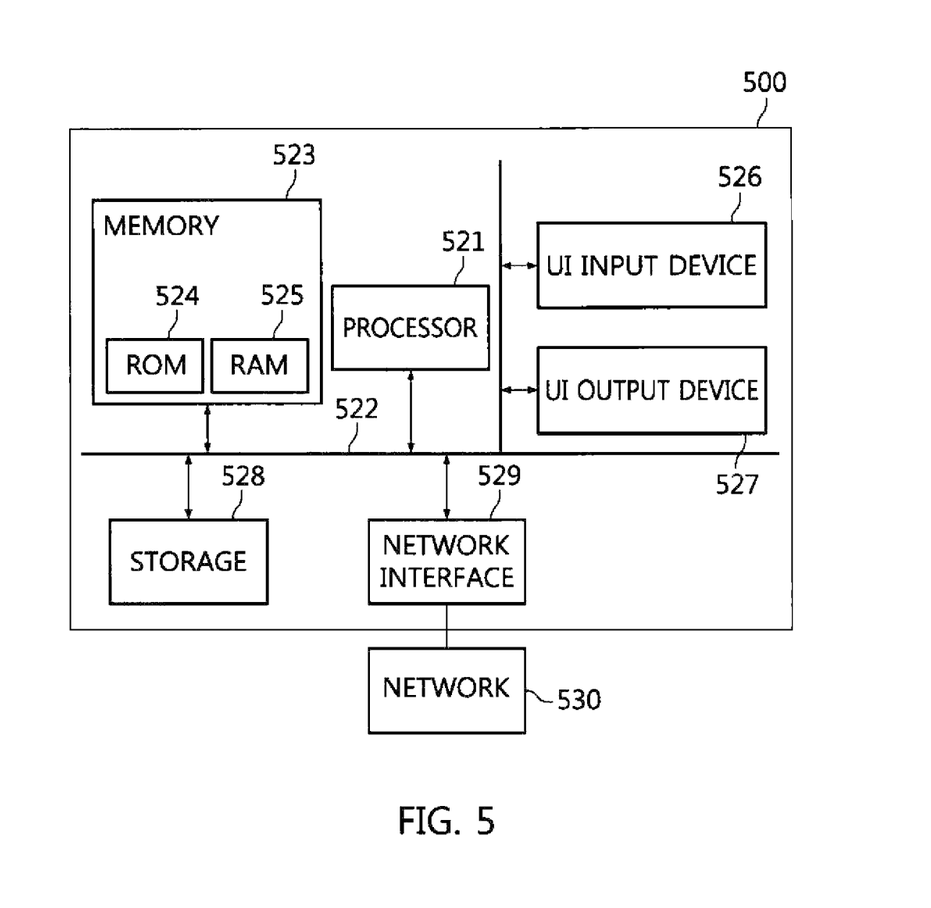
FIG. 5 illustrates a computer that implements an operation apparatus according to an example.

FIG. 5 illustrates a computer that implements an operation apparatus 100 according to an example.

The operation apparatus 100 may be implemented as a computer 500 illustrated in FIG. 5.

The operation apparatus 100 may be implemented in a computer system including a computer-readable storage medium. As illustrated in FIG. 5, the computer 500 may include at least one processor 521, memory 523, a user interface (UI) input device 526, a UI output device 527, and storage 528 that can communicate with each other via a bus 522. Furthermore, the computer 500 may further include a network interface 529 that is connected to a network 530. The processor 521 may be a semiconductor device that executes processing instructions stored in a central processing unit (CPU), the memory 523 or the storage 528. The memory 523 and the storage 528 may be various types of volatile or nonvolatile storage media. For example, the memory may include ROM (read-only memory) 524 or random access memory (RAM) 525.

At least one module of the operation apparatus 100 may be configured to be stored in the memory 523 and to be executed by at least one processor 521. Functionality related to the data or information communication of the operation apparatus 100 may be performed via the network interface 529.

The at least one processor 521 may perform the above-described operations, and the storage 528 may store the above-described constants, variables and data, etc.

The methods according to embodiments of the present invention] may be implemented in the form of program instructions that can be executed by various computer means. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

At least one embodiment of the present invention provides an operation method and apparatus for implementing a compression function for fast message hashing.

At least one embodiment of the present invention provides an operation method and apparatus for implementing a compression function that are capable of enabling message hashing while ensuring protection from attacks.

At least one embodiment of the present invention provides an operation method and apparatus for implementing a compression function that use combinations of bit operators commonly used in a central processing unit (CPU), thereby enabling fast parallel processing and also reducing the computation load of a CPU.

At least one embodiment of the present invention provides an operation method and apparatus that enable the structure of a compression function to be defined with respect to inputs having various lengths.

Although the present invention has been described in conjunction with the limited embodiments and drawings, the present invention is not limited thereto, and those skilled in the art will appreciate that various modifications, additions and substitutions are possible from this description. For example, even when described technology is practiced in a sequence different from that of a described method, and/or components, such as systems, structures, devices, units, and/or circuits, are coupled to or combined with each other in a form different from that of a described method and/or one or more thereof are replaced with one or more other components or equivalents, appropriate results may be achieved.

Therefore, other implementations, other embodiments and equivalents to the claims fall within the scope of the attached claims.

What is claimed is:

1. A method for performing a compression operation for fast message hashing, comprising the steps of:
receiving a message and generating a plurality of expanded messages using the received message;
receiving chain variable data and converting the chain variable data into initial state data which is used in the following compression operation;
generating a final value of the state data by iterating a combination function and a step function using the state data and the plurality of expanded messages; and
updating the chain variable data using the state data of the final value, wherein the updated chain variable data is used to generate a final hash value, wherein:
the plurality of expanded messages is (R+1) messages ranging from $W_0$ to $W_R$, the message M is a concatenation of 32 sub messages ranging from M[0] to M[31], and the plurality of expanded messages is generated based on Equation 1 below:
the plurality of expanded messages is (R+1) messages ranging from $W_0$ to $W_R$, where R is an integer equal to or larger than 1, $$W_r = W_r[0] \| W_r[1] \| \ldots \| W_r[15], 0 \leq r \leq R \quad (1)$$

where $W_r$ is an (r+1)-th expanded message of the plurality of expanded messages, $W_r$ is a concatenation of 16 sub expanded messages, and, for x, i.e., an integer equal to or larger than 0 and equal to or smaller than 15, $W_r[x]$ is an (x+1)-th sub expanded message of $W_r$,
wherein the sub expanded messages are generated based on Equations 2, 3 and 4 below:

$$W_0[i] = M[i], \ 0 \leq i \leq 15 \quad (2)$$

$$W_1[i] = M[i+16], \ 0 \leq i \leq 15 \quad (3)$$

$$W_r[i] = W_r - 2[\tau(i)] \boxplus W_r - 1[i], \ 2 \leq r \leq R, \ 0 \leq i \leq 15 \quad (4)$$

where a value of $\tau(i)$ is an integer equal to or larger than 0 and equal to or smaller than 15, and $\tau$ is a bijective function.

2. The method of claim 1, further comprising generating a hash value for the message by applying a predetermined operation to the updated chain variable data.

3. The method of claim 1, wherein:
the message includes 32w bits;
w is an integer equal to or larger than 1; and
each of the plurality of expanded messages includes 16w bits.

4. The method of claim 1, wherein:
for integer r equal to or larger than 0 and equal to or smaller than R, an (r+1)-th expanded message $W_r$ of the plurality of expanded messages is used in an (r+1)-th iteration of the combination function.

5. The method of claim 1, wherein τ meets Equations 5 and 6 below:

$$\tau(\tau(\tau(\tau(i))))=i, \quad 0\leq i\leq 15 \quad (5)$$

$$i\neq\tau(i)\neq\tau(\tau(i))\neq\tau(\tau(\tau(i))), \quad 0\leq i\leq 15 \quad (6)$$

where the value of τ(i) is an integer equal to or larger than 0 and equal to or smaller than 15, and τ is a bijective function.

6. The method of claim 1, wherein τ meets Equation 7 below:

$$\text{int}(\tau(i*4)/4)=\text{int}(\tau(i*4+1)/4)=\text{int}(\tau(i*4+2)/4=\text{int}(\tau(i*4+3)/4), \quad 0\leq i\leq 3. \quad (7)$$

7. The method of claim 1, wherein T is defined for each value if i by Equation 8 below:

$$\begin{aligned}&\tau(0)=3, \tau(1)=2, \tau(2)=0, \tau(3)=1, \tau(4)=7, \tau(5)=4,\\&\tau(6)=5, \tau(7)=6, \tau(8)=11, \tau(9)=10, \tau(10)=8,\\&\tau(11)=9, \tau(12)=15, \tau(13)=12, \tau(14)=13,\\&\tau(15)=14.\end{aligned} \quad (8)$$

8. A method for performing a compression operation for fast message hashing, comprising the steps of:
  receiving a message and generating a plurality of expanded messages using the received message;
  receiving chain variable data and converting the chain variable data into initial state data which is used in the following compression operation;
  generating a final value of the state data by iterating a combination function and a step function using the state data and the plurality of expanded messages; and
  updating the chain variable data using the state data of the final value, wherein the updated chain variable data is used to generate a final hash value, wherein:
  the step function is iterated R times;
  the plurality of expanded messages is (R+1) messages ranging from $W_0$ to $W_R$, where R is an integer equal to or larger than 1,
  for integer r equal to or larger than 0 and equal to or smaller than (R−1), $X_{r+1}$ is generated based on $X_r$ in an (r+1)-th iteration of the step function;
  $X_r$ is state data in an (r+1)-th iteration of the step function; and
  $X_0$ is the state data having the initial value, and $X_R$ is the state data having the final value, wherein $X_{r+1}$ is generated in the (r+1)-th iteration of the step function according to Equation 11 below:

$$X_{r+1}[i]=X_r[\sigma(i)], \quad 0\leq i\leq 15 \quad (11)$$

where a value of σ(i) is an integer equal to or larger than 0 and equal to or smaller than 15, and σ a bijective function.

9. The method of claim 8, wherein, in an (r+1)-th iteration of the step function,
  for i equal to or larger than 0 and equal to or smaller than 7, $X_r[i]$ is updated based on $X_r[i+8]$; and
  for i equal to or larger than 8 and equal to or smaller than 15, $X_r[i]$ is updated based on $X_r[i-8]$.

10. The method of claim 9, wherein, for i equal to or larger than 0 and equal to or smaller than 15, $X_r[i]$ is updated through rotation of a predetermined number of bits.

* * * * *